United States Patent
Okada et al.

(10) Patent No.: US 9,134,419 B2
(45) Date of Patent: Sep. 15, 2015

(54) ULTRASONIC DIAGNOSIS APPARATUS

(75) Inventors: Kengo Okada, Nasushiobara (JP); Hiroyuki Shikata, Nasushiobara (JP)

(73) Assignees: KABUSHIKI KAISHA TOSHIBA, Tokyo (JP); TOSHIBA MEDICAL SYSTEMS CORPORATION, Otawara-Shi (JP)

(*) Notice: Subject to any disclaimer, the term of this patent is extended or adjusted under 35 U.S.C. 154(b) by 439 days.

(21) Appl. No.: 13/156,899

(22) Filed: Jun. 9, 2011

(65) Prior Publication Data
US 2011/0319764 A1   Dec. 29, 2011

(30) Foreign Application Priority Data
Jun. 23, 2010   (JP) ................ 2010-143099

(51) Int. Cl.
*A61B 8/00* (2006.01)
*G01S 15/89* (2006.01)
*G01S 7/52* (2006.01)
*G10K 11/34* (2006.01)

(52) U.S. Cl.
CPC ......... *G01S 15/8927* (2013.01); *G01S 7/52046* (2013.01); *G01S 15/8925* (2013.01); *G10K 11/346* (2013.01)

(58) Field of Classification Search
USPC ........................ 600/407, 437–472
See application file for complete search history.

(56) References Cited

U.S. PATENT DOCUMENTS

| | | | |
|---|---|---|---|
| 5,031,625 A | 7/1991 | Higashiizumi et al. | |
| 6,155,982 A | 12/2000 | Hunt | |
| 6,622,562 B2 | 9/2003 | Angelsen et al. | |
| 7,785,260 B2 | 8/2010 | Umemura et al. | |
| 8,167,806 B2 | 5/2012 | Umemura et al. | |
| 2003/0144591 A1 | 7/2003 | Smith et al. | |
| 2004/0243000 A1* | 12/2004 | Umemura et al. | 600/437 |
| 2005/0243812 A1 | 11/2005 | Phelps | |
| 2007/0078345 A1 | 4/2007 | Mo et al. | |
| 2007/0293764 A1 | 12/2007 | Umemura et al. | |
| 2008/0027323 A1 | 1/2008 | Freiburger | |

(Continued)

FOREIGN PATENT DOCUMENTS

| | | |
|---|---|---|
| CN | 1529567 A | 9/2004 |
| CN | 101238991 A | 8/2008 |
| JP | 01-195844 A | 8/1989 |

(Continued)

OTHER PUBLICATIONS

KR Office Action with English Summary for KR Application No. 10-2011-0052211 mailed on Jul. 25, 2012.

(Continued)

*Primary Examiner* — Mark Remaly
(74) *Attorney, Agent, or Firm* — Yoshida & Associates, LLC

(57) ABSTRACT

The ultrasonic diagnosis apparatus according to the embodiments transmits ultrasonic waves to a subject, generates an ultrasound image based on the signals received from the subject, and comprises sub arrays, a main array, an aperture diameter setting part, and a delay pattern setting part. The sub arrays consist of a plurality of ultrasound transducers that are two-dimensionally disposed, and have a fixed delay pattern during a single receiving period. The main array consists of sub arrays. The aperture diameter setting part sets the aperture diameter of the main array. The delay pattern setting part changes the delay pattern for each of the sub arrays depending on the aperture diameter.

6 Claims, 11 Drawing Sheets

(56) References Cited

U.S. PATENT DOCUMENTS

| | | |
|---|---|---|
| 2008/0037695 A1* | 2/2008 | Kono et al. .................. 376/249 |
| 2008/0139937 A1 | 6/2008 | Nohara et al. |

FOREIGN PATENT DOCUMENTS

| | | |
|---|---|---|
| JP | 05-200027 A | 8/1993 |
| JP | 06-237930 A | 8/1994 |
| JP | 06-277220 A | 10/1994 |
| JP | 2001-276064 A | 10/2001 |
| JP | 2003-175038 A | 6/2003 |
| JP | 2005-066055 A | 3/2005 |
| JP | 2005-152629 A | 6/2005 |
| KR | 1992-0008815 B1 | 3/1991 |
| KR | 10-1996-0016298 B1 | 2/1994 |
| KR | 2002-0079140 A1 | 10/2002 |
| WO | 02/054379 A2 | 7/2002 |
| WO | 2007/039972 A1 | 4/2007 |

OTHER PUBLICATIONS

CN Office Action with English Summary for CN Application No. 201110170105.8 mailed on Nov. 21, 2012.

Japanese Office Action with its English Translation for Japanese Patent Application No. 2010-143099 mailed on Dec. 17, 2013.

* cited by examiner

FOCAL LENGTH 15mm

FOCAL LENGTH 60mm

FOCAL LENGTH 120mm

FOCAL LENGTH 15mm

FOCAL LENGTH 60mm

FOCAL LENGTH 120mm

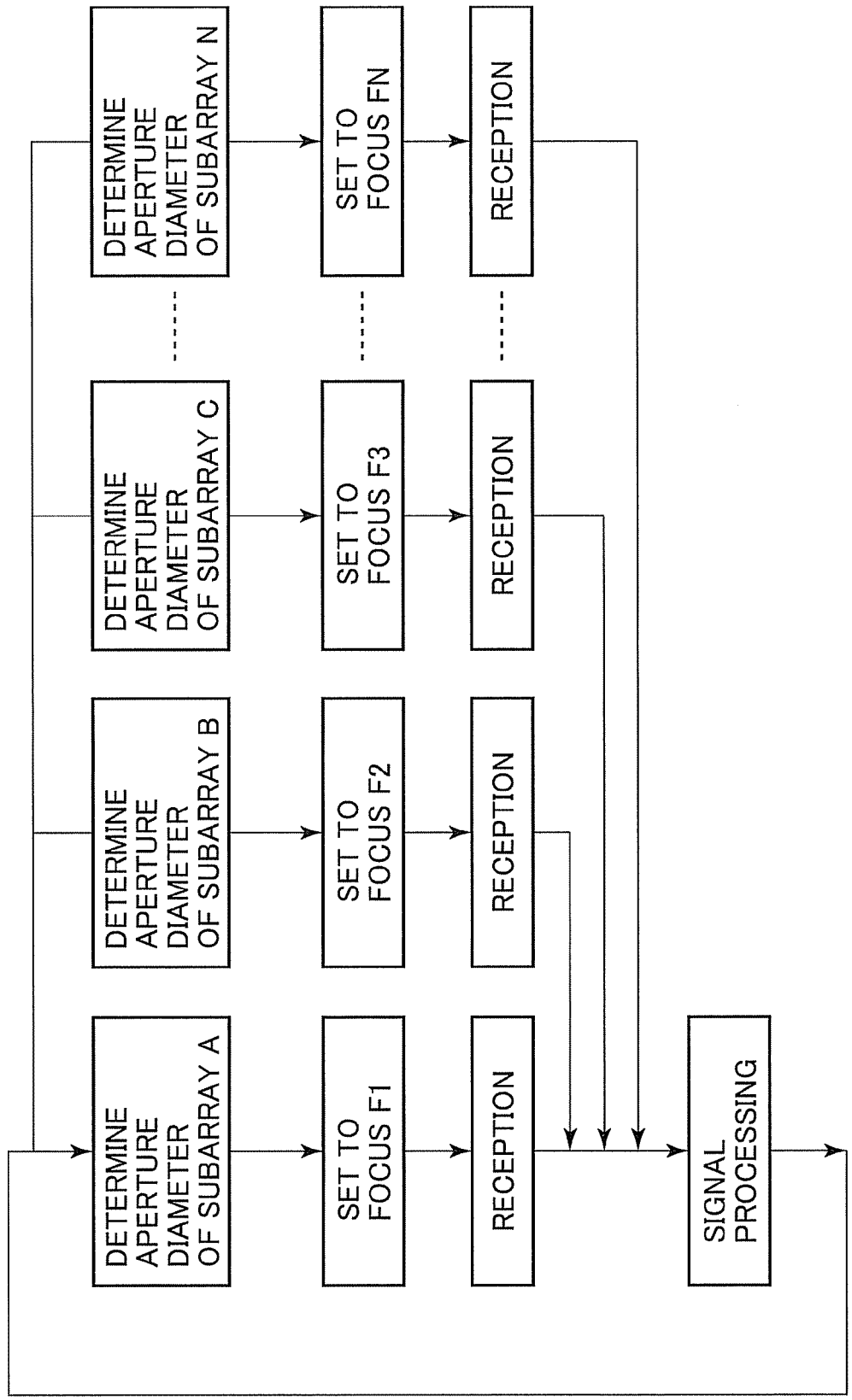

ULTRASONIC DIAGNOSIS APPARATUS

CROSS-REFERENCE TO RELATED APPLICATION

This application is based upon and claims the benefit of priority from Japanese Patent Application No. 2010-143099, filed Jun. 23, 2010; the entire contents of which are incorporated herein by reference

FIELD

Embodiments relate to an ultrasonic diagnosis apparatus.

BACKGROUND

An ultrasonic diagnosis apparatus is used in the medical field for diagnosing diseases in organisms (patients). In particular, the ultrasonic diagnosis apparatus transmits ultrasonic waves into a subject with an ultrasound probe comprising ultrasound transducers. Following this, it receives with the ultrasound probe reflected ultrasonic waves generated by the mismatch of acoustic impedance within the subject, and images the subject's internal condition based on such reflected waves.

For an ultrasonic diagnosis apparatus, a one-dimensional array probe with a plurality of ultrasound transducers that are arranged in an array is used.

However, good images over a wide range cannot be obtained because although high resolution is obtained near a focal point, sufficient resolution is not obtained in areas that are away from the focal point.

Thus, a technology in which each ultrasound transducer has a different focal length, and the aperture diameter of the ultrasound transducer at the time of reception is changed depending on the focal length has been proposed.

However, this proposed technology uses ultrasound transducer arrays that are linearly aligned, and has not been considered for use in ultrasound probes with ultrasound transducer arrays that are two-dimensionally arranged.

BRIEF DESCRIPTION OF THE DRAWINGS

FIG. 10 is an illustrative diagram of operation to illustrate the operation regarding the relationship between the determination of the aperture diameter and the determination of the focal point in the embodiment.

DETAILED DESCRIPTION

The ultrasonic diagnosis apparatus according to the embodiments transmits ultrasonic waves to a subject, generates an ultrasound image based on the signals received by the subject, and comprises sub arrays, a main array, an aperture diameter setting part, and a delay pattern setting part. The sub arrays consist of a plurality of ultrasound transducers that are two-dimensionally disposed, and have a fixed delay pattern during a single receiving period. The main array consists of sub arrays. The aperture diameter setting part sets the aperture diameter of the main array. The delay pattern setting part changes the delay pattern for each of the sub arrays depending on the aperture diameter.

Example 1

A configuration of the ultrasonic diagnosis apparatus according to the first embodiment is described with reference to FIG. 1 and FIG. 2.

Figure 1:
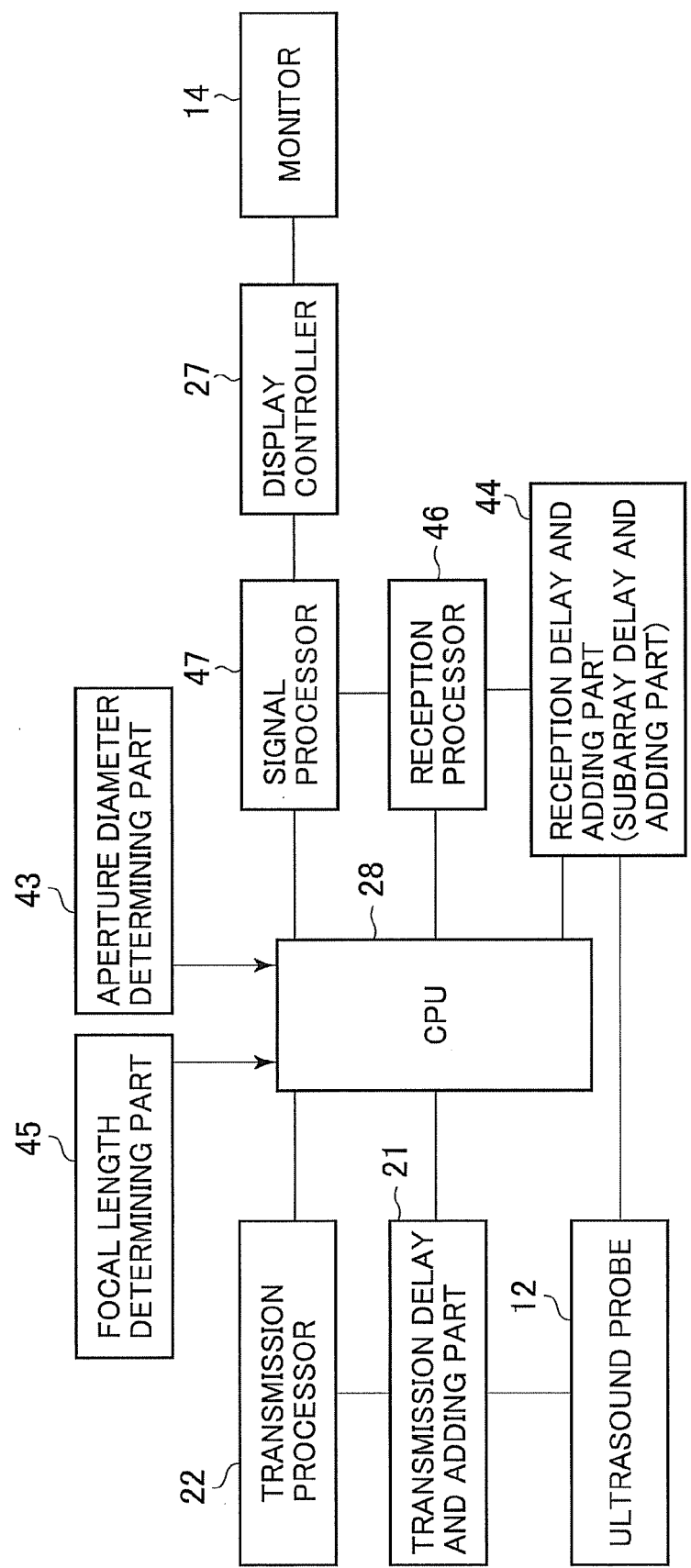
FIG. 1 is a block diagram showing the schematic configuration of the ultrasonic diagnosis apparatus according to the first embodiment.
Figure 2:
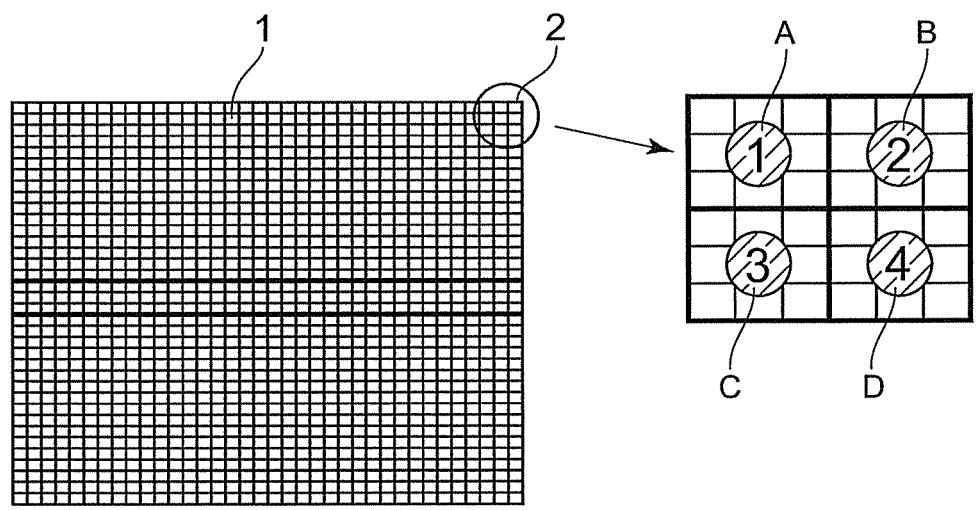
FIG. 2 shows a layout of the two-dimensional matrix array in the first embodiment.

FIG. 1 is a block diagram showing the schematic configuration of the ultrasonic diagnosis apparatus according to an embodiment. As shown in FIG. 1, the ultrasonic diagnosis apparatus according to the present embodiment comprises an ultrasound probe 12, a transmission delay and adding part 21, a transmission processor 22, a central processing unit (CPU) 28, an aperture diameter determining part 43, a reception delay and adding part (sub array delay and adding part) 44, a focal length determining part 45, a reception processor 46, a signal processor 47, a display controller 27, and a monitor 14.

The ultrasound probe 12 is provided with ultrasound transducers, a matching layer, and a backing material, etc.

For ultrasound probe 12, a plurality of ultrasound transducers are provided on a known rear surface material, and a known matching layer is provided on those ultrasound transducers. That is, the rear surface material, the ultrasound transducers, and the matching layer are laminated in that order. In the ultrasound transducers, the surface on which the matching layer is provided is the radiation surface for the ultrasonic waves, and its opposite side (the surface on which the rear surface material is provided) is the rear surface. Common (GND) electrodes are connected to the radiation surface of the ultrasound transducers, and signal electrodes are connected to the rear surface.

For an ultrasound transducer, an acoustic/electrically-reversible converting element, etc. such as piezoceramic element, etc. can be used.

For example, ceramic materials such as lead zirconate [zirconium] titanate (Pb (Zr, Ti) $O_3$), lithium niobate ($LiNbO_3$), barium titanate ($BaTiO_3$), or lead titanate ($PbTiO_3$), etc. are preferably used.

The ultrasound transducers generate ultrasonic waves based on drive signals from the transmission processor 22. The generated ultrasonic waves are reflected on the discontinuous surface of acoustic impedance within the subject.

Each ultrasound transducer receives these reflected waves and generates signals, which are taken into the reception processor 46 for each channel.

The matching layer is provided to improve the acoustic matching between the acoustic impedance of the ultrasound transducers and the acoustic impedance of the subject. The matching layer can be a single layer, or two or more layers can be provided.

The backing material prevents the propagation of ultrasonic waves backwards from the ultrasound transducer.

Also, among ultrasonic oscillations that are oscillated from the ultrasound transducers and the ultrasonic oscillation at the time of reception, the rear surface material absorbs and attenuates unnecessary ultrasonic oscillation components for image extraction of the ultrasonic diagnosis apparatus. In general, materials such as synthetic rubber, epoxy resin or polyurethane rubber, etc. mixed with inorganic particulate powders such as tungsten, ferrite, and zinc oxide, etc. are used for the rear surface material.

In the first embodiment, a two-dimensional matrix array with two-dimensionally arranged sub arrays is used. FIG. 2 shows a layout of the two-dimensional matrix array in the first embodiment. In FIG. 2, the two-dimensional matrix array consists of a main array 1. In addition, a sub array 2 consists, for example, of ultrasound transducer groups a circle A, a circle B, a circle C, and a circle D. The main array 1 has the sub arrays 2, arranged in a two-dimensional matrix. By using a sub array as a unit, signals are processed for each sub array and therefore it is possible to reduce the throughput assigned to the CPU, and also to reduce the amount of wiring, etc.

Figure 3:
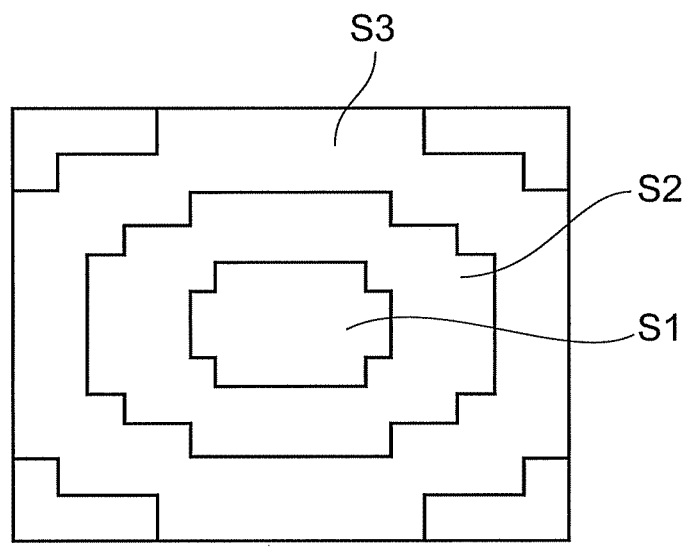
FIG. 3 is a diagram of aperture change showing changes in the aperture of the two-dimensional matrix array in the first embodiment.

FIG. 3 is a diagram of aperture change showing changes in the aperture of the two-dimensional matrix array in the first embodiment.

FIG. 3 illustrates the changes in the aperture diameter from S1 of the minimum diameter to S2, and then to S3, as the aperture diameter increases. In the main array 1 of FIG. 2, the size of the aperture diameter is adjusted by increasing or decreasing the number of sub arrays 2 used. For example, in order to enlarge the size of the aperture diameter, the number of sub arrays used is increased. On the other hand, in order to reduce the size of the aperture diameter, the number of sub arrays used is decreased.

Figure 4:
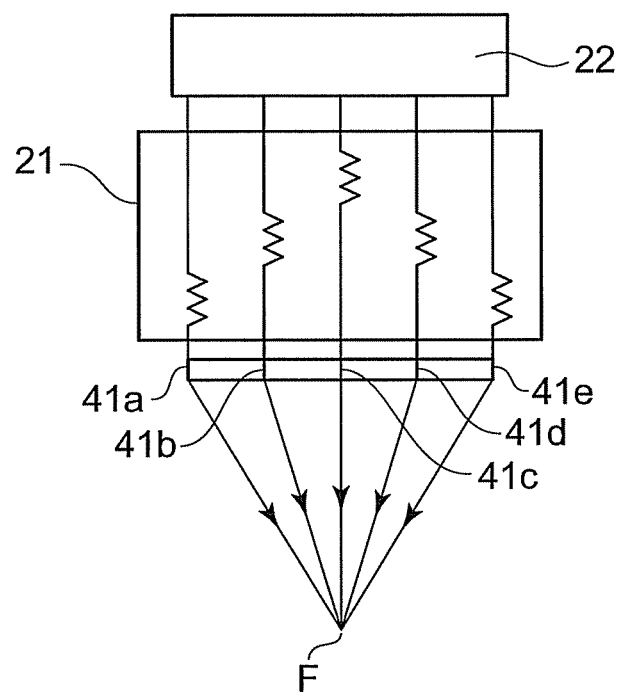
FIG. 4 is a pattern diagram showing the addition of transmission delay in the first embodiment.

FIG. 4 is a pattern diagram showing the addition of transmission delay in the first embodiment. In FIG. 4, a delay is introduced by the transmission delay and adding part 21 at the time of transmitting ultrasonic waves to perform a delayed focus. That is, there is a path difference between the distance from the ultrasound transducers in the sub array 41*c*, which is located closer to the center of the aperture, to the focal point F and the distance from the ultrasound transducers in the sub arrays 41*a* and 41*e*, which are located at the edges of the aperture, to the focal point F. Consequently, in order for the ultrasonic beams to be focused at the focal point F, the timing of transmitting ultrasonic waves from the ultrasound transducers in the sub array 41*c* that is located closer to the center should be delayed for the ultrasound transducers in the sub arrays 41*a* and 41*e* that are located at the edges that are further away from the focal point. Also, for the sub arrays 41*b* and 41*d* that are located between the center of the aperture and the edges of the aperture, the timing of transmission should be delayed depending on the distance to the focal point F. Thorough this processing, ultrasonic beams are in phase when reaching the focal point F, so that they can form a focal point.

The transmission processor 22 has a signal generator, a transmission mixer, and a frequency modulation/demodulation unit. It generates drive pulse signals at the timing of transmission to which a delay was introduced, and transmits them to the ultrasound transducers.

Figure 5:
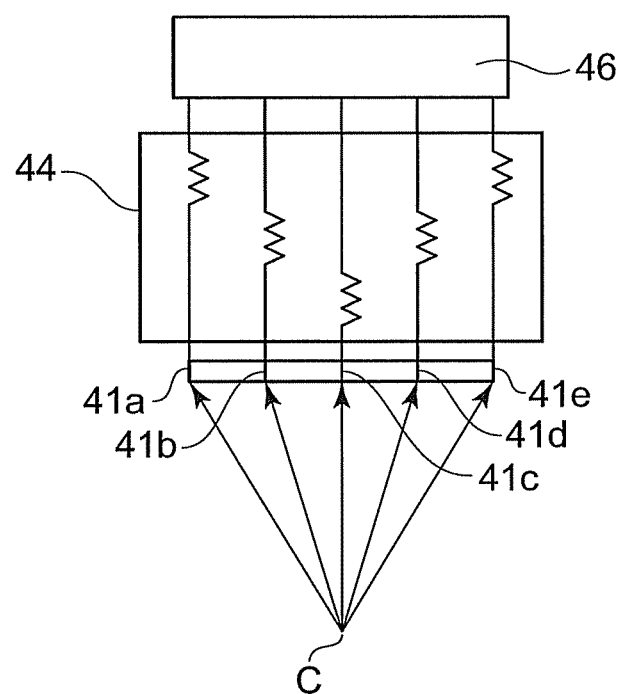
FIG. 5 is a pattern diagram showing the addition of reception delay in the first embodiment.

FIG. 5 is a pattern diagram showing the addition of reception delay in the first embodiment. The additive processing is performed by the reception delay and adding part (sub array delay and adding part) 44 by adding delay time to the signals received by the ultrasound transducers in the sub arrays included in the aperture diameter. For reception, a delay needs to be added at the opposite timing of the timing of transmission shown in FIG. 4. That is, with regard to the ultrasonic beams returning from the focal point F, the timing of receiving the ultrasonic waves in the sub array 41*c* that is located closer to the center should be faster for the ultrasound transducers in the sub arrays 41*a*, 41*e* that are located at the edges that are further away from the focal point F. Also, for the sub arrays 41*b* and 41*d*, which are located between the edges and the center, an adjustment can be made by making the timing of reception faster depending on the distance between each ultrasound transducer and the focal point.

The aperture diameter determining part 43 is included in the main delay and adding part (not shown) in the central processing unit (CPU) 28. The aperture diameter determining part 43 determines the size of the aperture diameter of the main array. To determine the size of the aperture diameter, a matrix switch can be used. The matrix switch is a switch that allows multi-input and multi-output. The matrix switch changes the size of the aperture diameter of the main array by increasing or decreasing the number of sub arrays that are connected to the transmission processor 22. For example, the matrix switch adjusts the size of the aperture diameter of the main array by selecting a group of ultrasound transducers consisting of m (≤n), among several ultrasound transducers e1, e2, through en in the main array, as a constituent unit of a sub array, and increasing or decreasing the number of sub arrays connected to the transmission processor 22. For example, in FIG. 3, the aperture diameter is S1 when the number of sub arrays is minimal, and the number of sub arrays can be increased to have the maximum aperture diameter S3, via the aperture diameter S2.

Figure 6:
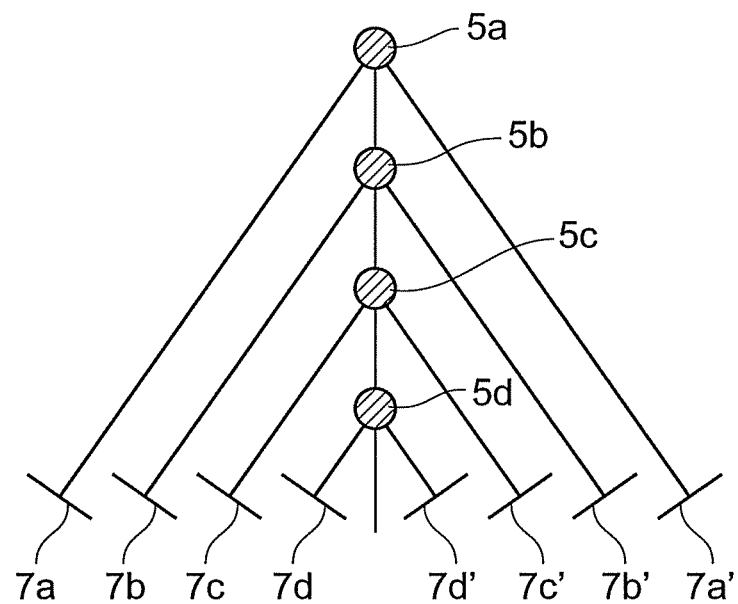
FIG. 6 is a pattern diagram showing the relationship between the aperture of the main array and the focal point for each sub array in the first embodiment.

FIG. 6 is a pattern diagram showing the relationship between the aperture of the main array and the focal point for each sub array in the first embodiment. In FIG. 6, the aperture diameter determining part 43 changes the aperture diameter over the course of the transmission period, after the transmission of ultrasonic waves is started. The aperture diameter determining part 43 determines the aperture diameter based on the data that has been previously entered.

In the present embodiment, the focal length determining part 45 changes the position of the focal point for the sub arrays, depending on the size of the aperture diameter selected by the aperture diameter determining part 43. By using this processing, signals are processed as if they are received for each sub array with different focal length. The focal length determining part 45 determines the focal length for the sub arrays so that the focal length becomes longer as the aperture diameter becomes larger.

Also, it is possible to determine the focal length of the sub arrays at the second aperture diameter, which has the second shortest focal length, to be the length equal to the focal length for the sub arrays at the first aperture diameter, which has the shortest focal length, multiplied by $\sqrt{2}$.

The description is made in detail with reference to FIG. 3 and FIG. 6. For instance, the minimum aperture diameter S1 in FIG. 3 corresponds to sub arrays 7*d* and 7*d'* in FIG. 6. As shown in FIG. 6, the focal length determining part 45 determines the position of the focal point at 5*d* for the sub arrays 7*d* and 7*d'* that were determined by the aperture diameter determining part 43. Similarly, the maximum aperture diameter S3 in FIG. 3 corresponds to sub arrays 7a and 7a' in FIG. 6. As shown in FIG. 6, the focal length determining part 45 determines the position of the focal point at 5a for the sub arrays 7a and 7a' that were determined by the aperture diameter determining part 43. Similarly, as shown in FIG. 6, the focal point is determined at 5c for sub arrays 7c and 7c' whose aperture diameters are between the minimum and maximum diameters, and the focal point is determined at 5b for sub arrays 7b and 7b'.

The transmission delay and adding part 21 performs delay additive processing depending on said focal length. The reception delay and adding part 44 performs delay additive processing at the opposite timing of the delay timing performed by the transmission delay and adding part 21.

The reception processor 46 has an apodization unit (not shown), a frequency modulation/demodulation unit (not shown), a reception buffer unit (not shown), a reception mixer (not shown), DBPF (not shown), a discrete Fourier transform unit (not shown), and a beam memory (not shown). It receives signals at the timing of reception to which a delay was introduced and amplifies them. The amplified signals are output to the signal processor 47.

The signal processor 47 has an A/D conversion circuit, a B-mode processing circuit, and a Doppler processing circuit, etc.

The A/D conversion circuit performs A/D conversion on the signals received by the reception processor 46.

The B-mode processing circuit receives signals from the reception processor 46, performs logarithmic amplification and envelope detection processing, etc. to generate data in which its signal intensity is expressed as the degree of luminance. This data is transmitted to the display controller 27, and displayed on a monitor 14 as the B-mode image in which the intensity of the reflected waves is expressed as luminance.

The Doppler processing circuit performs frequency analysis on the signals received from the reception processor 46 for the velocity information, and extracts blood flow, tissue, and contrast echo components by Doppler effect, to obtain the blood flow information for various aspects such as average velocity, variance, and power, etc.

Especially, the Doppler processing circuit sequentially reads multi-phase demodulation data from the reception processor 46 and calculates the spectrum that is obtained at each range, and calculates data of CW spectrum image based on these information.

The display controller 27 generates ultrasonic images using the data received from the signal processor 47. In addition, it combines the generated images with character information and scales, etc. of various parameters, and outputs to the monitor 14 as video signals.

The central processing unit (CPU) 28 functions as an information processing device and controls the behavior of each of the said components. That is, it controls the behaviors of the main body of the ultrasonic diagnosis apparatus. The central processing unit 28 reads a dedicated program to implement a real time display function for three-dimensional images, which will be described later, from the storage and the control program, to perform a specific scan sequence, and loads them in its own memory to perform calculation and control, etc. for each type of processing.

A storage stores the following: a specific scan sequence to collect a plurality of volume data for the different image angle settings; a dedicated program to achieve real time display function for three-dimensional images; a control program to generate images and perform display processing; diagnostic information (patient ID, physician's findings, etc.); a diagnostic program; conditions for transmission and reception; a body mark generation program, and other data groups.

Figure 7:
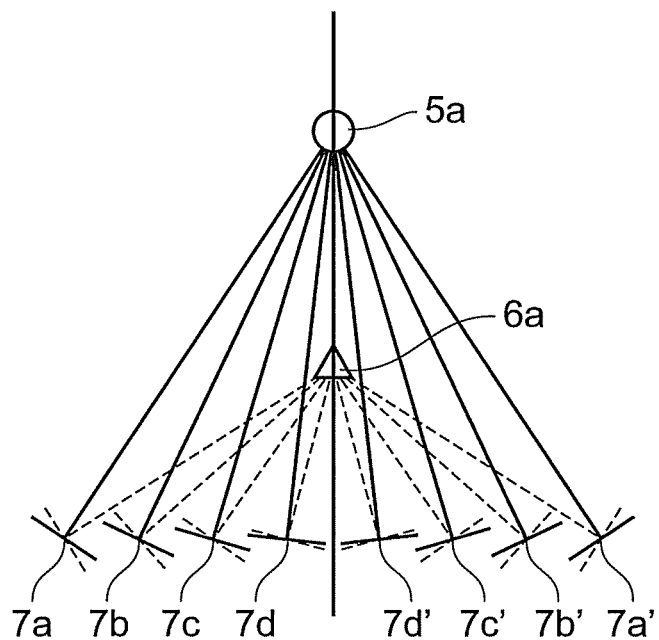
FIG. 7 is a pattern diagram showing the relationship between the aperture of conventional main array and the focal point for each sub array.

FIG. 7 is a pattern diagram showing the relationship between the aperture of conventional main array and the focal point for each sub array. As shown in the FIG. 7, conventionally, regardless of the size of the aperture diameter, the same position of the ideal focal point 5a is used for all of the sub arrays 7a, 7a', 7b, 7b', 7c, 7c', 7d, and 7d' to perform delay additive processing, so that the focal length will be the same. In FIG. 7, at the actual focal point 6a, which is closer in distance than the ideal focal point 5, delay errors occur in each sub array.

Figure 8A:
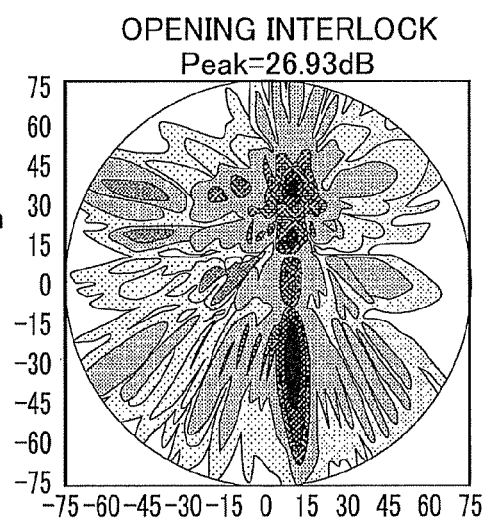
FIGS. 8A, 8B, and 8C show the distribution of the acoustic field formed when ultrasonic waves are received by the ultrasonic diagnosis apparatus according to the embodiment.
Figure 8B:
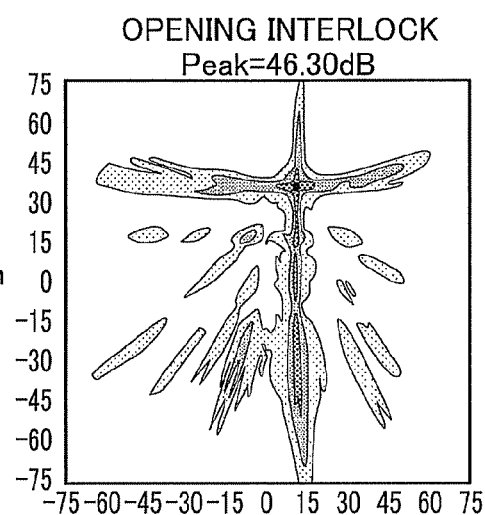
Figure 8C:
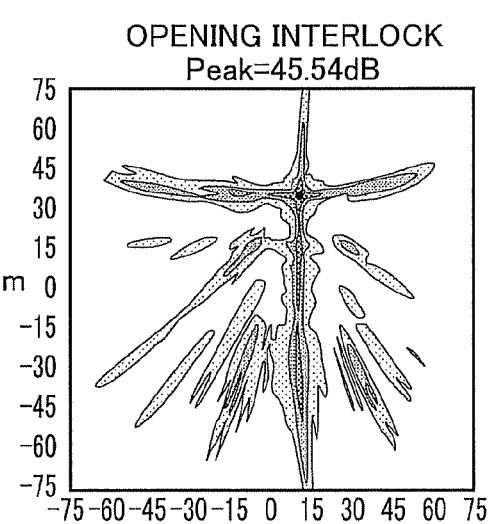

FIGS. 8A, 8B, and 8C show the distribution of the acoustic field formed when ultrasonic waves are received by the ultrasonic diagnosis apparatus according to the embodiment. FIG. 8A shows the distribution of the acoustic field at the focal length of 15 mm. FIG. 8B shows the distribution of the acoustic field at the focal length of 60 mm. FIG. 8C shows the distribution of the acoustic field at the focal length of 120 mm.

Figure 9A:
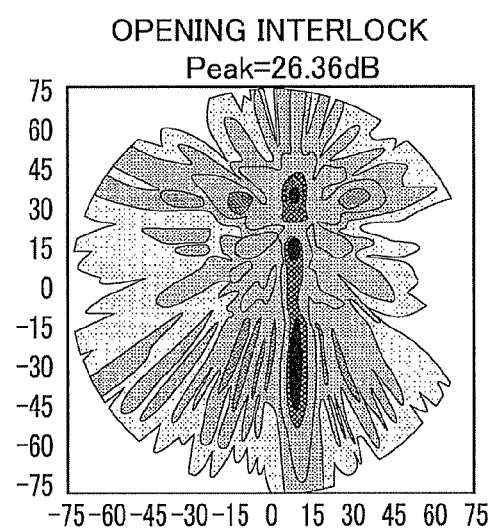
FIGS. 9A, 9B, and 9C show the distribution of the acoustic field formed when the ultrasonic waves are received according to the conventional technology.
Figure 9B:
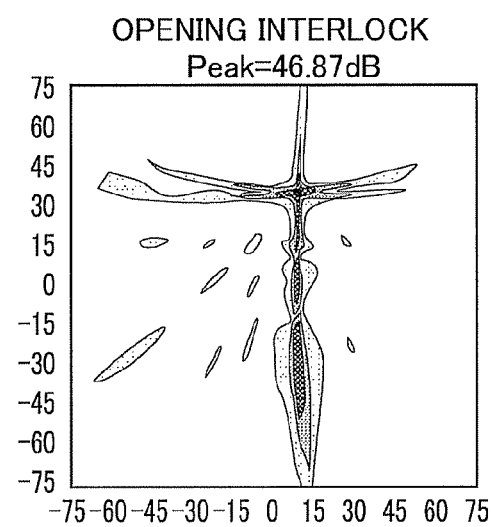
Figure 9C:
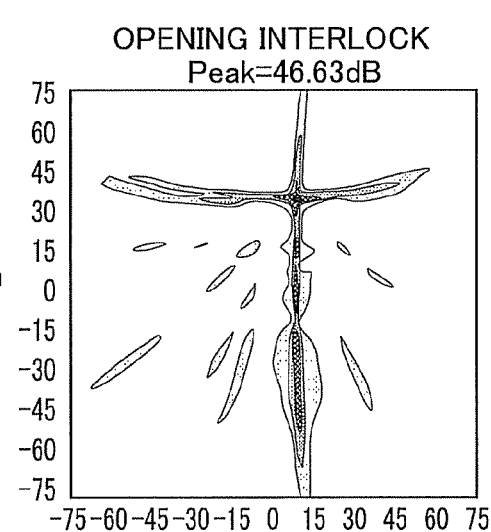

FIGS. 9A, 9B, and 9C show the distribution of the acoustic field formed when the ultrasonic waves are received according to the conventional technology. FIG. 9A shows the distribution of the acoustic field at the focal length of 15 mm. FIG. 9B shows the distribution of the acoustic field at the focal length of 60 mm. FIG. 9C shows the distribution of the acoustic field at the focal length of 120 mm.

When comparing both figures, in the case of a focal length of 15 mm, the grating lobe intensity is lower in the embodiment than the intensity of the grating lobe formed by the conventional technology.

Also, with regard to the difference in the grating lobe intensity for the position with different focal length (each depth), the difference is smaller in the embodiment than in the conventional technology.

FIGS. 9A, 9B, and 9C shows the acoustic field formed when the ultrasonic waves are received according to the conventional technology.

When comparing the cases of the focal length of 15 mm between FIG. 9A and FIG. 8A, the grating lobe is formed and the image quality is reduced due to the reduction in the acoustic S/N ratio. Also, in the case of the focal length of 120 mm, when comparing FIG. 9C and FIG. 8C, the image quality and sensitivity are reduced.

FIG. 10 is an illustrative diagram of operation to illustrate the operation regarding the relationship between the determination of the aperture diameter and the determination of the focal point in the embodiment.

Figure 11A:
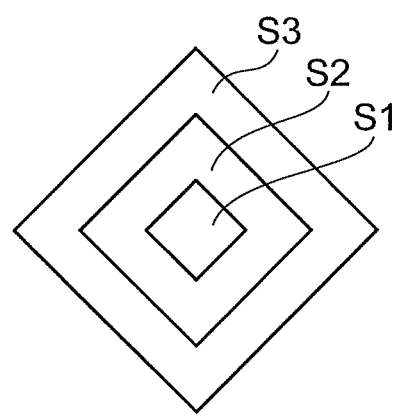
FIG. 11 is a pattern diagram to illustrate the relationship between the changes in the aperture diameter and the focal point in the embodiment.
Figure 11B:
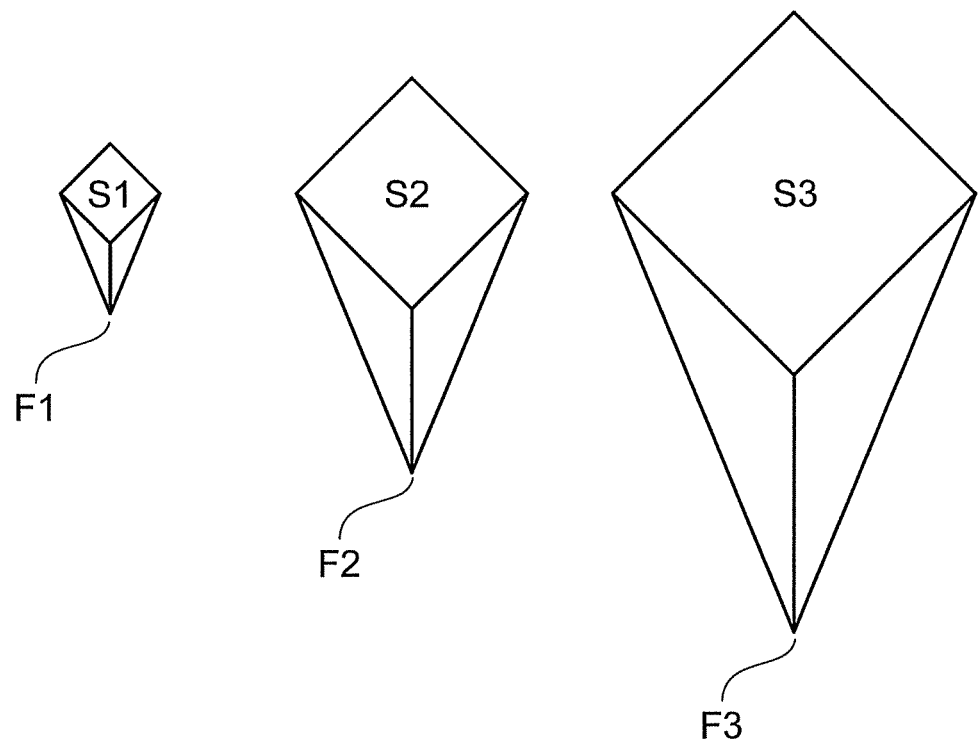

FIG. 11 is a pattern diagram to illustrate the relationship between the changes in the aperture diameter and the focal point in the embodiment.

In FIG. 11, the aperture diameter of sub array A is the minimum aperture, and that minimum aperture diameter is S1 and its focal point is F1; as the aperture diameter of the sub array becomes larger as shown in S2 and S3, accordingly its focal point will become F2 and F3.

Returning to FIG. 10, the aperture diameter determining part 43 determines the size of the aperture diameter of the sub array A to be S1.

The focal length determining part 45 determines the focal point F1. The reception delay and adding part 44 performs delay additive processing, which corresponds to the determined focal point F1, on the received signals, and transmits to the reception processor 46. The signal processor 47 performs signal processing on the received signals to which delay additive processing has been performed. The aperture diameter determining part 43 determines the size of the aperture diameter of sub array B to be S2. The focal length determining part 45 determines the focal point F2. The reception delay and adding part 44 performs delay additive processing, which corresponds to the determined focal point F2, on the received signals, and transmits to the reception processor 46. The signal processor 47 performs signal processing on the received signals to which delay additive processing has been performed. The aperture diameter determining part 43 determines the size of the aperture diameter of the sub array C to be S3.

The focal length determining part 45 determines the focal point F3. The reception delay and adding part 44 performs delay additive processing, which corresponds to the determined focal point F3, on the received signals, and transmits to the reception processor 46. The signal processor 47 performs signal processing on the received signals to which delay additive processing has been performed. The aperture diameter determining part 43 determines the size of the aperture diameter of sub array N to be SN. The focal length determining part 45 determines the focal point FN. The reception delay and adding part 44 performs delay additive processing, which corresponds to the determined focal point FN, on the received signals, and transmits to the reception processor 46. The signal processor 47 performs signal processing on the received signals to which delay additive processing has been performed. According to the present embodiment, in the images of the portion with shorter focal length, the generation of grating lobe is prevented and the image quality is not reduced due do the reduction in the acoustic S/N ratio. In addition, in the images of the portion with longer focal length, the difference in the image quality in the depth direction becomes smaller, and uniform image quality can be obtained throughout the imaging field.

Example 2

Next, the second embodiment of the ultrasonic diagnosis apparatus will be described with reference to the figures. The present embodiment is different from the first embodiment in that the focal length is determined at first, and then the aperture diameter is determined in response to that length. Each component in the present embodiment is the same as that of the first embodiment.

Figure 12:
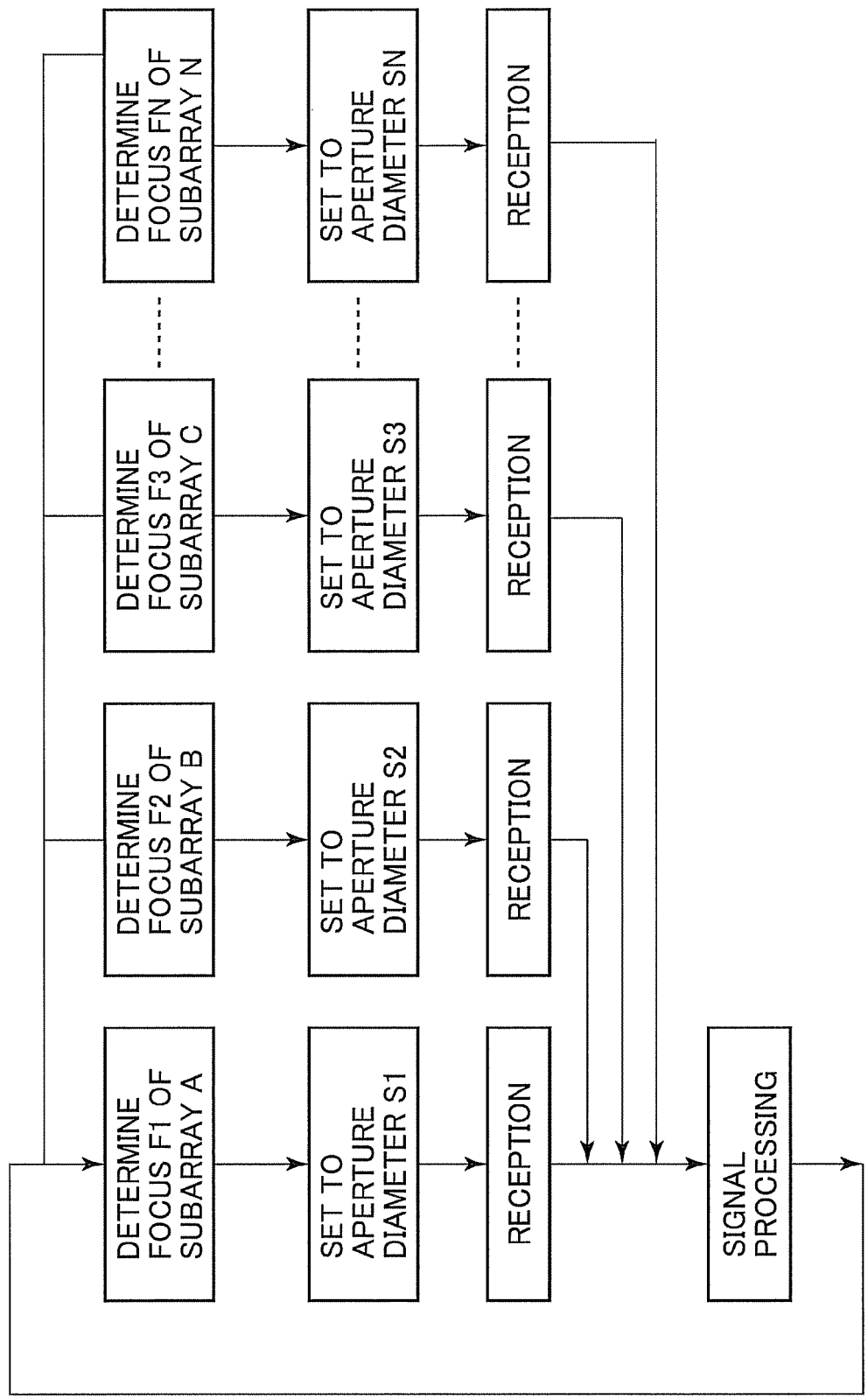
FIG. 12 is an illustrative diagram of operation to illustrate the operation regarding the relationship between the determination of the focal length and the determination of the aperture diameter in the second embodiment.

FIG. 12 is an illustrative diagram of operation to illustrate the operation regarding the relationship between the determination of the focal length and the determination of the aperture diameter in the embodiment.

The focal length determining part 45 determines the focal point F1 of the sub array A so that the focal length shown in FIG. 11 is the minimal. The aperture diameter determining part 43 determines the aperture diameter S1. The reception delay and adding part 44 performs delay additive processing, which corresponds to the determined aperture diameter S1, on the received signals, and transmits to the reception processor 46. The signal processor 47 performs signal processing on the received signals to which delay additive processing has been performed. The focal length determining part 45 determines the focal point F2 for the sub array B. The aperture diameter determining part 43 determines the aperture diameter S2. The reception delay and adding part 44 performs delay additive processing, which corresponds to the determined aperture diameter S2, on the received signals, and transmits to the reception processor 46. The signal processor 47 performs signal processing on the received signals to which delay additive processing has been performed. The focal length determining part 45 determines the focal point F3 for sub array B. The aperture diameter determining part 43 determines the aperture diameter S3. The reception delay and adding part 44 performs delay additive processing, which corresponds to the determined aperture diameter S3, on the received signals, and transmits to the reception processor 46.

The signal processor 47 performs signal processing on the received signals to which delay additive processing has been performed.

The focal length determining part 45 determines the focal point F3 for sub array N. The aperture diameter determining part 43 determines the aperture diameter SN. The reception delay and adding part 44 performs delay additive processing, which corresponds to the determined aperture diameter SN, on the received signals, and transmits to the reception processor 46. The signal processor 47 performs signal processing on the received signals to which delay additive processing has been performed. According to the present embodiment, in the images of the portion with shorter focal length, the generation of grating lobe is prevented and the image quality is not reduced due do the reduction in the acoustic S/N ratio. In addition, in the images of the portion with longer focal length, the difference in the image quality in the depth direction becomes smaller, and uniform image quality can be obtained throughout the imaging field.

The above embodiment described the focal length determining part 45 that determines the focal length so that the focal length becomes longer depending on the aperture diameter of the main array.

However, a component to change the delay pattern for each sub array depending on the aperture diameter of the main array (delay pattern setting part) may be provided.

As an example of the delay pattern setting part, it has the first memory to store in advance the sub array used depending on the aperture diameter of the main array, and the second memory to store in advance the delay pattern for each sub array. As the aperture diameter of the main array changes, the sub arrays for the aperture diameter are read from the first memory, and furthermore, the delay pattern for each sub array is read from the second memory. Accordingly, it allows changing the delay pattern for each sub array depending on the aperture diameter of the main array.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of embodiments described herein may be made without departing from the spirit of the inventions. The accompanying claims and their equivalents are intended to cover such forms or modifications as would fall within the scope and spirit of the inventions.

What is claimed is:

1. An ultrasonic diagnosis apparatus, comprising:
 a plurality of ultrasound transducers constructing a main array, the main array divided into sub arrays consisting of two or more ultrasound transducers;
 a control circuitry configured to
  set an aperture consisting of some of the sub arrays, and
  set a reception delay pattern with respect to each of the some sub arrays constructing the aperture;
 a reception delay and adding circuitry configured to
  perform a reception delay addictive processing for echo signals acquired through each of the some sub arrays constructing the aperture using the set reception delay with respect to each of the some sub arrays constructing the aperture, and
  output signals as a result of the reception delay additive processing; and a reception processing circuitry configured to perform a beam forming by using the signals; wherein
the size of the aperture does not change during a single receiving period;
the reception delay pattern does not change during the single receiving period;
the reception delay pattern changes in response to the change of the size of the aperture; and
the reception delay pattern set to the sub array arranged inside of the aperture differs from the reception delay pattern set to the sub array arranged outside of the aperture.

2. The ultrasonic diagnosis apparatus according to claim 1, wherein the delay pattern changes, so that a focal length of sub arrays for a second aperture diameter will be a length equal to $\sqrt{2}$ times the focal length of sub arrays for a first aperture diameter.

3. The ultrasonic diagnosis apparatus according to claim 1, wherein the size of the aperture of the main array changes over a course of a transmission period, after the transmission of ultrasonic waves is started.

4. An ultrasonic diagnosis apparatus, comprising:
a plurality of ultrasound transducers constructing a main array, the main array divided into sub arrays consisting of two or more ultrasound transducers;
a control circuitry configured to
set an aperture consisting of some of the sub arrays, and
determine a reception focal length with respect to each of the some sub arrays constructing the aperture;
a reception delay and adding circuitry configured to
perform a reception delay additive processing for echo signals acquired through each of the some sub arrays constructing the aperture using the set reception delay with respect to each of the some sub arrays constructing the aperture, and
output signals as a result of the reception delay additive processing; and
a reception processing circuitry configured to perform a beam forming by using the signals; wherein
the size of the aperture does not change during a single receiving period;
the reception focal length does not change during the single receiving period;
the reception focal length changes in response to the change of the size of the aperture; and
the reception focal length determined to the sub array arranged inside of the aperture differs from the reception focal length determined to the sub array arranged outside of the aperture.

5. The ultrasonic diagnosis apparatus according to claim 4, wherein the control circuitry configured to determine a reception focal length for the sub arrays at a second aperture diameter to be the length equal to $\sqrt{2}$ times the reception focal length for the sub arrays at a first aperture diameter.

6. The ultrasonic diagnosis apparatus according to claim 4, wherein the size of the aperture of the main array changes over a course of a transmission period, after the transmission of ultrasonic waves is started.

* * * * *